Jan. 5, 1971  V. SUBOVICI  3,553,622
LAMINATED MAGNETIC CORE

Filed May 9, 1969  3 Sheets-Sheet 1

INVENTOR
VADIM SUBOVICI
BY
Karl F. Ross
ATTORNEY

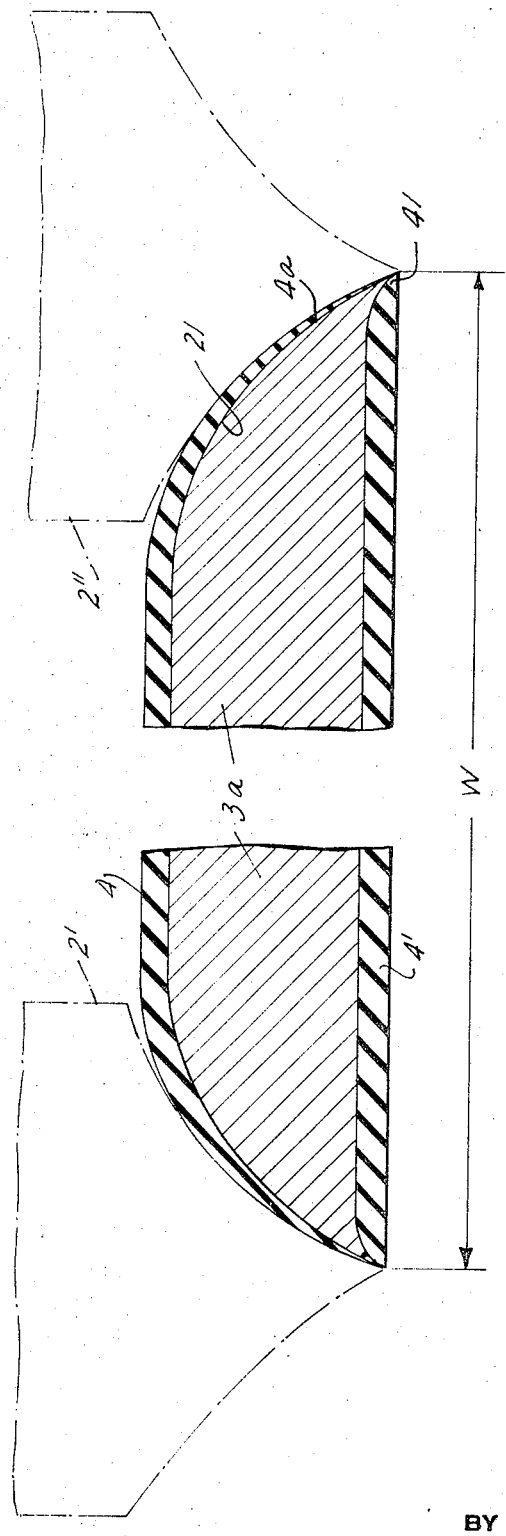

United States Patent Office 3,553,622
Patented Jan. 5, 1971

3,553,622
LAMINATED MAGNETIC CORE
Vadim Subovici, Bucharest, Rumania, assignor to Ministerul Industries Constructilor de Masini, Galea Victoriei, Bucharest, Rumania
Continuation-in-part of application Ser. No. 485,481, Sept. 7, 1965. This application May 9, 1969, Ser. No. 823,462
Claims priority, application Rumania, Sept. 10, 1964, 48,504
Int. Cl. H01f 27/24
U.S. Cl. 336—219                                    6 Claims

ABSTRACT OF THE DISCLOSURE

In making a laminated magnetic core, a steel sheet coated on one or both sides with a dielectric layer is scored by a blunt tool which, acting through the dielectric layer, deforms the metallic substrate together with that layer whereby, upon complete penetration of the substrate, two sheet sections with confronting sloping edges at least partly covered by insulation are obtained. A strip so cut from a coated sheet may be coiled into a core body having end faces with serrated profiles formed by the sloping edges of the strip; by flattening these edges, the end faces are smoothed while remaining covered over a substantial part of their area by the insulation overlying the flanks of the serrations.

---

This application is a continuation-in-part of my co-pending application Ser. No. 485,481 filed Sept. 7, 1965, now Pat. No. 3,460,367.

My present invention relates to a laminated magnetic core made by coiling or stacking one or more strips of ferromagnetic sheet metal, such as sheet steel, which are mutually insulated by the presence of a dielectric layer on at least one surface of each lamina.

As noted in my above-identified patent, it is known to minimize the generation of eddy currents in such cores by forming a series of parallel cuts across the surfaces of the several laminae. If these grooves cut through the insulating layers, close juxtaposition of the laminae may result in insufficient mutual insulation in the region of each cut.

It is also customary to trim the edges of the coiled or stacked strip or strips to produce a core of predetermined height having a pair of smooth end faces. These core faces are constituted by relatively wide metallic zones separated by relatively narrow dielectric zones so that short circuits easily develop acros the juxtaposed metal strips.

It is, therefore, the general object of my present invention to provide an improved core structure avoiding the aforestated disadvantages.

In accordance with one aspect of this invention, as described in my above-identified patent, the ferromagnetic substrate with an insulating layer on one surface (hereinafter referred to for convenience as the top surface) is scored with the aid of a blunt implement which forms a groove of generally triangular profile (usually referred to as a V-groove) in that surface, the depth of the groove being substantially greater than the thickness of the insulating layer. As the tool bears upon the insulating layer and plastically deforms the underlying metal, portions of the layer are bent inwardly along the flanks of the groove and are stretched so as to decrease progressively in thickness toward the bottom of the groove.

If the tool does not completely penetrate the metallic substrate, the latter remains as a unitary strip or sheet which may be formed into a core structure, as by coiling it about an axis parallel to a multiplicity of such grooves formed at spaced locations throughout the length of the strip. The deformed insulating layer, though stretched thin at the bottom of each groove, retains its continuity to prevent direct short circuits between adjacent turns of the coil constituting the laminae of the magnetic core.

The same technique can be used, according to another aspect of my invention, by deepening the aforedescribed groove to form a furrow completely penetrating the metal sheet so as to sever the latter into separate segments. This operation extends the tapering flank portions of the top layer to the underside of the sheet so that each of these sheet sections has a sloping edge which includes an obtuse angle with the insulated sheet surface and is covered by an extension of the dielectric layer thereon. When such a strip is wound into a coil in a plane parallel to this sloping edge, the end face of the coil defined by this edge has a serrated profile which, in axial cross-section, consists of a series of sawteeth whose inclined flanks are covered by extensions of the insulating layers separating the turns of the coil. According to another feature of my invention, I flatten this profile by passing over the sawteeth in the general direction of their rising flanks so as to form a smooth core face largely covered by insulation. Naturally, the same operation can be performed along the other strip edge to provide a second core face of like character.

If the underside of the strip is coated with another dielectric layer, the latter may come into contact with the deflected flank portions of the first layer so as to form therewith a continuous insulating skin enveloping the metallic substrate. Usually, however, this continuity is subsequently broken upon the deformation of the serrated profile to flatten the core face.

The same flattening treatment may be used on a stack of individual strips or sheets juxtaposed with their sloping edges parallel to one another.

The invention will be described in greater detail with reference to the accompanying drawing in which:

FIG. 4 is a fragmentary cross-sectional view of a portion of a laminated strip deformed substantially in the manner illustrated in FIG. 2;

Figure 1A:
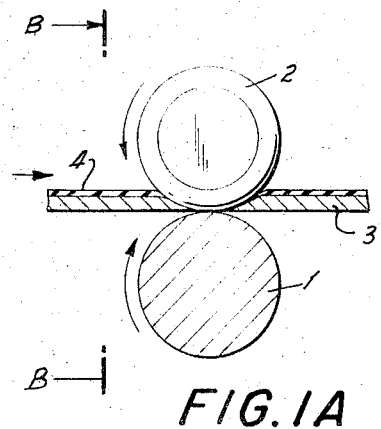
FIG. 1A is a cross-sectional view of a device for deforming a metal sheet with an insulation-covered top surface to be incorporated in a magnetic core structure according to the invention.

In FIG. 1A I have shown a ferromagnetic steel sheet 3 covered on one surface, i.e. on its top side, with an insulating layer 4, this sheet being fed between an elongated lower roller 1 and a scoring roller 2 of generally wedge-shaped but blunt profile. According to FIG. 1B the sheet 3 is also provided on its lower surface with a similar dielectric layer 4'.

Figure 1B:
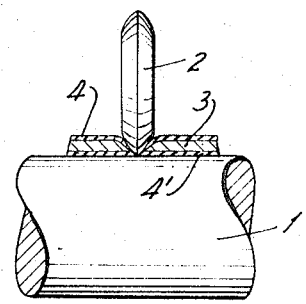
FIG. 1B is a view taken on the line B—B of FIG. 1A but with replacement of the unilaterally coated sheet thereof by a metal sheet having coated top and bottom surfaces.
Figure 2:
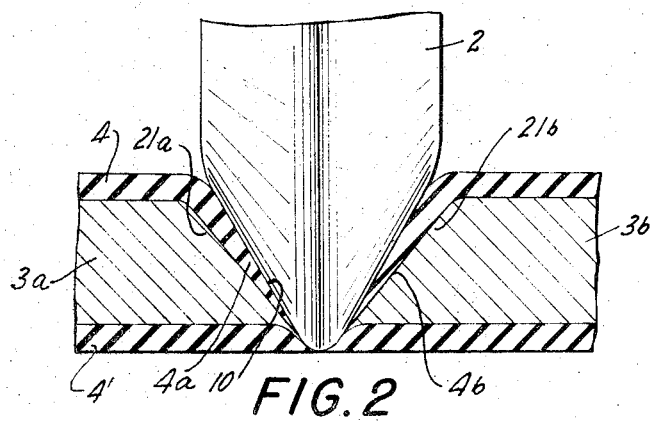
FIG. 2 is a view similar to part of FIG. 1B, drawn to a larger scale.

The relative rotation of scoring roller 1 and counter-roller 1 in mutually opposite directions, as indicated by the arrows in FIG. 1A, results in the formation of a furrow 10 completely penetrating the sheet 3 as best seen in FIG. 2. The latter figure also shows that the metallic substrate 3 is plastically deformed by the tool 2 and that portions 4a, 4b of layer 4 are bent inwardly along the flanks of the furrow 10, these portions extending well into the profile of the furrow and tapering toward the bottom thereof while still being of appreciable thickness over the major part of each flank. If, as shown in FIGS. 1B and 2, the tool 2 reaches a lower layer 4' in the deformation process, layer portions 4a and 4b will join this lower layer under the lateral and downward pressure of the tool. The penetration of the sheet by the tool 2 results in the formation of separate sheet sections 3a, 3b, with sloping edges 21a, 21b overlain by the extensions 4a and 4b of layer 4. Thus, each sheet section is fully encased, at least in the vicinity of its sloping edge, by a skin of insulating material formed by the two layers 4 and 4' meeting along a ridge line 41 illustrated in FIG. 4. In similar manner, as likewise shown in FIG. 4, a remote edge of each sheet section (here section 3a) can be shaped and covered in the aforedescribed manner with the aid of an identical scoring tool; the rollers 2', 2" of FIG. 4 differ somewhat in profile from the tool 2 of FIG. 2 to produce slightly convex flanks 21.

Figure 3:
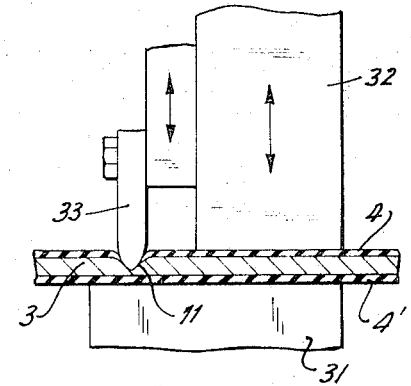
FIG. 3 is a view similar to FIG. 1A, showing a modified apparatus for scoring the sheet of FIG. 1B.
Figure 7:
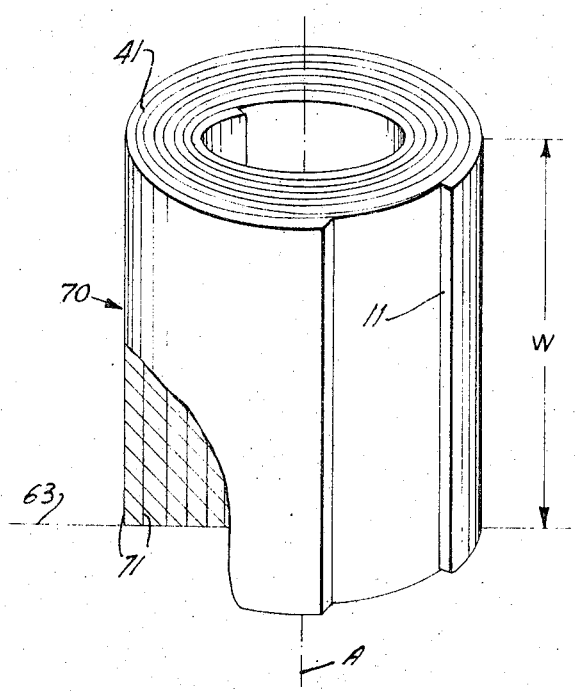
FIG. 7 is a perspective view, partially broken away, of a magnetic core coiled from the strip shown in FIG. 4 and flattened in the manner illustrated in FIG. 6.

FIG. 3 shows the sheet 3 with its two layers 4 and 4' placed on a flat bed 31 underneath a vertically reciprocating ram 32 carrying a scoring tool 33 of the same general profile as roller 2; ram 32, on descending, clamps the sheet 3 in place and also limits the depth of penetration of the tool 33 whose downward stroke is here shown to terminate short of the bottom layer 4'. The groove 11 formed thereby in the sheet may extend transversely to the furrows made by the rollers 2', 2" to produce an elongated strip with lateral ridges 41 and transverse score lines 11 which may be coiled into a magnetic core structure 70 as shown in FIG. 7. The device of FIG. 3 may, however, also be used for complete penetration of the sheet as described in connection with FIG. 2.

Figure 5:
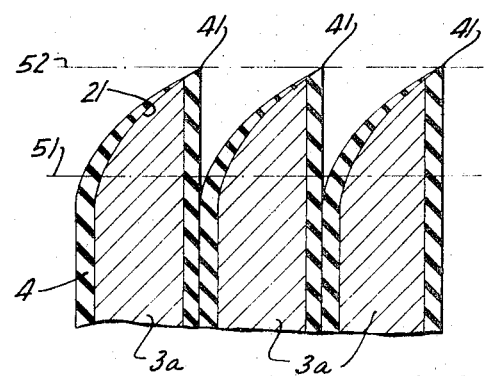
FIG. 5 shows part of a laminated core structure whose laminae are of the type illustrated in FIG. 4.

FIG. 5 illustrates several turns of the coiled core structure with its spiral ridge 41 and adjoining layers 4, 4' at the boundaries of the turns. In contradistinction to conventional practices under which the end faces of the core would be trimmed by a cut along, say, line 51 to remove the irregular edge portions rising above that line to a level 52, I flatten the sawtooth-shaped profile with the aid of a tool 61 (FIG. 6), such as a roller journaled on a frame 62, by driving this tool under downward pressure across the peaks 41 of the serrations in the direction of inclination of the rising tooth flanks 21, i.e. from left to right as viewed in FIGS. 5 and 6. This results in a deformation of layers 3, 4, 4' in the same direction in the region of a transverse plane 63 along which the tapering dielectric layers 4 and 4' are deflected so as to overlie a substantial part of the spiral edge of the coiled metal strip 3, thereby effectively insulating adjacent turns thereof from one another.

A flattened face 71 so produced has been illustrated at the lower end of the core 70 in FIG. 7, it being understood that the ridges 41 of its upper face may be similarly smoothed. In order to perform the aforedescribed directional flattening, the roller 61 may be radially displaced in several passes from the outer periphery of the core toward its axis A, along different diameters, to cover the entire annular area of the core face.

Figure 6:
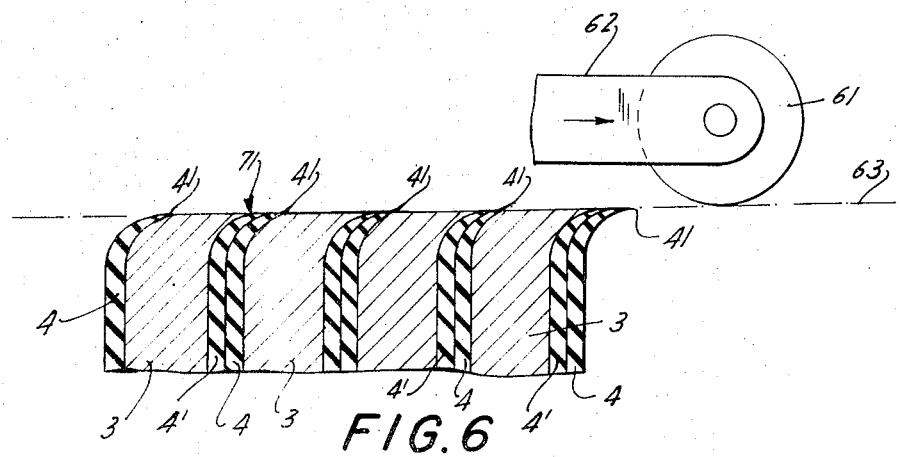
FIG. 6 shows the core structure of FIG. 5 after a smoothing operation.

FIG. 5 is also representative of a plurality of different sheet segments juxtaposed with their edges 21 parallel and generally of the same height to form a stack which is subsequently flattened as shown in FIG. 6.

Figure 8:
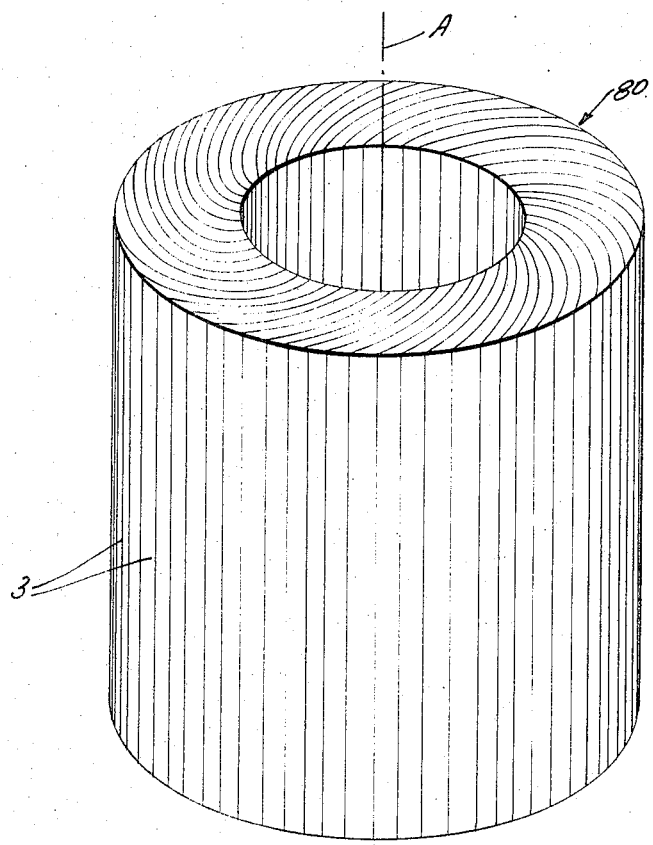
FIG. 8 is a view similar to FIG. 7, perspectively illustrating another core structure embodying the invention.

FIG. 8 illustrates the curving of such a stack to form an annular core 80; the edges of the stacked laminae may be flattened either before or after they are bent about axis A to form the generally cylindrical body 80.

The outlines of the zonal boundaries between layers 3, 4, 4' in the vicinity of core face 71, in the cross-sectional view of FIG. 6, may be described as arcs tangent to the plane 63 of that face.

I claim:
1. A magnetic core structure comprising a body composed of a plurality of juxtaposed laminate, each consisting of a substrate of ferromagnetic sheet material and at least one dielectric layer on a surface of said substrate, the dielectric layers of said laminae forming insulating boundaries between the substrates of adjacent laminae, said body having a face transverse to said boundaries formed by generally coplanar edges of said laminae, said substrates being at least partly overlain at said generally coplanar edges by extensions of said dielectric layers forming an insulating covering over at least a substantial portion of the area of said face, said laminae being generally beveled in the region of said face with said layers extending over the beveled portions thereof.

2. A core structure as defined in claim 1 wherein each lamina has a second dielectric layer on the side of its substrate opposite the first-mentioned layer.

3. A core structure as defined in claim 1 wherein said layers taper in thickness along the zone of deformation upon approaching the plane of said face.

4. A core structure as defined in claim 3 wherein said body is generally annular, the direction of deformation being generally radically inwardly.

5. A core structure as defined in claim 4 wherein said substrates and said layers are separated, in the vicinity of said face, by zonal boundaries which, within an axial plane of said body, curve along arcs tangent to the plane of said face.

6. A core structure as defined in claim 2 wherein the dielectric layers on opposite sides of each substrate merge into a continuous coating insulating the edge of said substrate adjoining said face.

References Cited

UNITED STATES PATENTS

| 1,441,522 | 1/1923 | Patterson | 336—219X |
| 1,877,254 | 9/1932 | Ritter | 336—219X |
| 2,382,172 | 8/1945 | Putman et al. | 336—219X |
| 2,937,352 | 5/1960 | Vienneau et al. | 336—219X |
| 2,976,605 | 3/1961 | Lemaine | 336—234X |
| 3,271,718 | 9/1966 | Shaw | 336—219 |

THOMAS J. KOZMA, Primary Examiner

U.S. Cl. X.R.

29—609; 336—234